(12) United States Patent
Knittel

(10) Patent No.: US 7,327,635 B2
(45) Date of Patent: Feb. 5, 2008

(54) ADAPTIVE COMPARATOR CIRCUIT AND ACOUSTIC DISTANCE SENSOR COMPRISING SAID CIRCUIT

(75) Inventor: Thomas Knittel, Waldsee (DE)

(73) Assignee: Pepperl + Fuchs GmbH, Mannheim (DE)

( * ) Notice: Subject to any disclaimer, the term of this patent is extended or adjusted under 35 U.S.C. 154(b) by 121 days.

(21) Appl. No.: 10/450,932

(22) PCT Filed: Dec. 14, 2000

(86) PCT No.: PCT/EP00/12758

§ 371 (c)(1),
(2), (4) Date: Oct. 21, 2004

(87) PCT Pub. No.: WO02/48737

PCT Pub. Date: Jun. 20, 2002

(65) Prior Publication Data

US 2005/0041528 A1    Feb. 24, 2005

(51) Int. Cl.
*G01S 15/10* (2006.01)
(52) U.S. Cl. .................................................. 367/98
(58) Field of Classification Search .............. 367/98, 367/99
See application file for complete search history.

(56) References Cited

U.S. PATENT DOCUMENTS 4,413,518 A * 11/1983 Jones ........................... 367/98
4,785,664 A    11/1988 Reebs
4,975,889 A    12/1990 Petrucelli et al.
5,077,701 A *  12/1991 Lill .............................. 367/98
2005/0041528 A1* 2/2005 Knittel ....................... 367/99

FOREIGN PATENT DOCUMENTS

| DE | 3339984  | 9/1987  |
|----|----------|---------|
| DE | 3713758  | 11/1988 |
| DE | 4208595  | 5/1993  |
| DE | 4218303  | 3/1994  |
| DE | 4433957  | 3/1996  |
| DE | 4114233  | 5/1996  |
| EP | 0265634  | 5/1988  |
| JP | 5572880  | 11/1978 |
| JP | 55072880 | 6/1980  |

* cited by examiner

*Primary Examiner*—Daniel Pihulic
(74) *Attorney, Agent, or Firm*—Horst M Kasper

(57) ABSTRACT

The invention relates to an adaptive comparator circuit comprising a comparator with a threshold value input which receives a threshold voltage and a signal input which receives a voltage signal. The threshold value input is connected to one pole by means of a switch and connected to the other pole of a first voltage source by means of a capacitor. The threshold value input is also connected to the signal input of the comparator by means of a diode or a second voltage source. The switch is controlled by the control signal of a signal transmitter. When the switch is in a closed position, the capacitor is charged with the voltage of the first voltage source. When the switch is in an open position, the capacitor is discharged in such a way that the threshold voltage of the signal voltage is corrected at a given time interval.

36 Claims, 8 Drawing Sheets

ADAPTIVE COMPARATOR CIRCUIT AND ACOUSTIC DISTANCE SENSOR COMPRISING SAID CIRCUIT

TECHNICAL AREA

Figure 1:
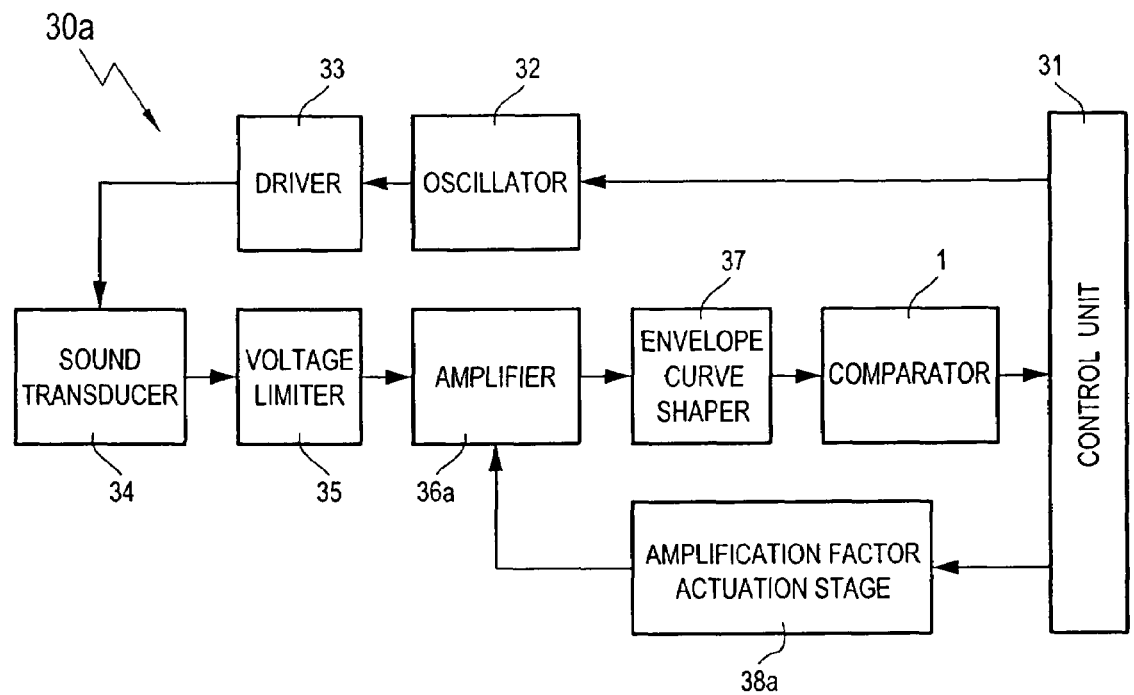

The invention relates to an adaptive comparator circuit that can be used particularly for reducing the short range of an acoustic distance sensor, as well as to an acoustic distance sensor with such a circuit.

STATE OF THE ART

Acoustic distance sensors are used to measure distances by means of the pulse-propagation time method. In this process, a sound transducer emits a short sound pulse that propagates in a medium (gas, liquid or solid). This pulse is reflected, for example, on an object and comes back as an echo. The distance to the object can be determined on the basis of the propagation time of the sound pulse and the sound velocity in the medium.

As a rule, the frequency of the sound used for such measurements lies in the ultra-sound range, typically in the range between 20 kHz and 500 kHz, for example, at 400 kHz. The sound transducer, which in particular can be a piezoelectric ceramic element, is normally used to transmit the sound pulse as well as to receive the echo. Typically, sound pulses of about 3 to 50 oscillations periods each are emitted. This results in time durations of typically about 6 to 2050 µs for the emitted sound pulses. During this time, i.e. the transmitting phase, the sound transducer oscillates at a high oscillation amplitude. This time duration is followed by a relaxation time in which the oscillation amplitude dies out—usually exponentially. The relaxation time is typically, for example, 300 µs to 3 ms.

The time interval between the end of the relaxation time and the emission of the next sound pulse will be called "quiescent phase" below. Due to noise and other interferences, however, the oscillation amplitude does not drop completely to zero even during the quiescent phase, but rather remains at a certain constant mean disturbance level. Therefore, during the receiving phase that follows the transmitting phase, even in the absence of a useful echo, the oscillation amplitude that dies out during the relaxation time and the mean disturbance level consistently form a finite background signal that is very large immediately after the end of the transmitting phase, that generally decreases exponentially within the relaxation time and that finally remains at the disturbance level.

A useful echo signal is superimposed on this background and, as a rule, is detected by means of a comparator that emits a switching signal when the received signal is greater than a certain reference value that will be called "threshold voltage" hereinafter. On the one hand, the threshold voltage should be as low as possible so that even weak useful echo signals, e.g. of small objects, can be detected, which translates into high sensitivity. On the other hand, the threshold voltage has to lie above the disturbance level by a certain safety margin so as to avoid erroneous triggering of the comparator during the quiescent phase.

When the threshold voltage is constant over time, useful echo signals can be detected as soon as the background signal has dropped below the threshold voltage as a result of the relaxation of the sound transducer. Before this time, however, that is to say, during the transmitting phase and during part of the relaxation time, the background signal is greater than the threshold voltage so that the comparator—irrespective of the presence of an echo—is triggered in any case during this time. Thus, during this time, called dead time, the system is fundamentally insensitive to the reception of echoes. Therefore, the measurement of distances below a certain minimum distance is impossible. This minimum distance is called the "short range" and is typically a few centimeters. The existence of the short range often has a detrimental effect, for example, wherever due to space constraints, the sensor is to be situated as close as possible to the object to be detected.

Various methods are known for reducing the short range. The simplest method is to increase the threshold voltage. This causes the background signal, which dies out after the transmitting phase, to drop below the threshold voltage at an earlier point in time within the relaxation time. However, this method entails the serious drawback the serious drawback that an increase in the threshold voltage translates into a reduction of the system sensitivity, as a result of which weak echoes can no longer be detected.

Another method lies in conveying the received signal through an amplifier whose amplification factor can be changed over time. The amplification factor is minimal immediately after the transmittal pulse and is then boosted, for example, by means of a suitable electronic circuit as a function of the time. In this manner, despite a constant threshold voltage over time, a reduction of the short range can be combined with a high sensitivity during the quiescent phase. Of course, for this purpose, the course over time of the amplification factor has to be adapted to the relaxation time. The drawback is that a one-time optimal adaptation is not sufficient here, since the relaxation time of the sound transducer is not constant but rather, it depends on the medium on the temperature, on the age of the sound transducer and on other influencing factors. Therefore, in actual practice, either complex compensation measures have to be undertaken or re-adaptations have to be made repeatedly, or else a large safety margin has to be maintained right from the start for purposes of optimal adaptation, which diminishes the system sensitivity, at least during the relaxation time.

Another method is to provide a threshold voltage that can be changed over time. In the ideal case, this threshold voltage drops at a gradient that is similar to the decaying background signal and, at the beginning of the quiescent phase, turns into a constant value, whereby the threshold voltage nevertheless always remains sufficiently greater than the background signal. This method can be additionally improved by subjecting the background signal to a logarithmic amplification so that the decrease is linear instead of exponential. The drawback here, however, is that a one-time adaptation of the time behavior of the threshold voltage is not sufficient to ensure optimal operation over the long run, since here, too, the individual dying-out behavior of the sound transducer is not taken into account on a case-to-case basis.

German Patent Application DE 37 13 758 A1 discloses a receiving circuit for an acoustic distance measuring device that functions on the basis of the pulse-echo propagation time method and that uses a time-variable amplification as well as a time-variable threshold voltage. The echo signal passes through several amplification stages connected in series, whereby at least one of them has an approximately logarithmic characteristic curve. This amplification stage is configured as an operation amplifier and is connected to a counter-coupling containing a component with a non-linear voltage and current characteristic. After passing through the amplification stages, the echo signal is demodulated and fed to the signal input of a comparator. This voltage signal is also grounded via a series connection consisting of a first resistor and a capacitor. Here, the connection of the capacitor that is connected to the first resistor is connected to the reference input of the comparator via a second resistor. The cited connection of the capacitor is also connected via a third resistor to a voltage source.

Another method for reducing the short range lies in the propagation time-dependent control of the length of the emitted sound pulses. In the case of a short propagation time, that is to say, in the case of an object that is close, very short sound pulses are used to that the oscillation amplitude of the sound transducer does not fully develop and thus the short range is reduced.

Another method lies in the use of a threshold voltage that is dynamically changed by means of a microprocessor and a D/A transducer. The microprocessor regulates the D/A transducer in such a way that a dynamic threshold is created that always lies above the dying-out signal. Here, an A/D transducer measures the decaying transmission signal.

These methods, however, call for considerable hardware and software resources.

Therefore, the invention is based on the objective of simply and inexpensively providing a comparator circuit with which, in every single case, the course over time of the threshold voltage is automatically adapted to the individual decay behavior of the sound transducer and the magnitude of the disturbance level.

This objective is achieved according to the invention by an adaptive comparator circuit, especially for an acoustic distance sensor, comprising a first comparator
- having a first threshold voltage input to which a first threshold voltage is applied and
- having a first signal input to which a voltage signal ($U_{signal}$) is applied and, when a voltage signal is present that is greater than the first threshold voltage, said comparator emits a first switching signal, characterized by
- a signal transmitter, especially a microcontroller or microprocessor, that at times emits a control signal,
- a first switch that has a control means, a switch input and a switch output, and first threshold value input, so that the first threshold voltage is equal to the voltage present at the switch output,
- a capacitor via which the switch output is connected to the negative or positive pole of the first direct voltage source, and
- a diode via which the switch output is connected to the first signal input in such a way that the anode or the cathode of the diode is connected to the switch output.

This is the first basic form of an adaptive comparator circuit according to the invention. According to the invention, instead of the diode, a second direct voltage source can be used whose positive pole is in the place of the anode of the diode and whose negative pole is in the place of the cathode of the diode. This is the second basic form of an adaptive comparator circuit according to the invention.

These two basic forms can be augmented advantageously as will still be explained below.

An acoustic distance sensor according to the invention comprises a control unit that at times transmits signal pulses to an oscillator which, during the presence of a signal pulse, transmits an alternating voltage to a sound transducer that is excited by the alternating voltage to emit sound waves and that is capable of receiving sound waves coming back to the sound transducer in the form of an echo as a result of reflection, and of converting them into an electric received signal, and it also comprises an envelope curve shaper to which the received signal is fed and which forms the envelope curve of the received signal and emits it as a voltage signal, characterized in that the voltage signal is fed to an adaptive comparator circuit comprising
- a first comparator having a first threshold voltage input to which a first threshold voltage is applied and a first signal input to which a voltage signal is applied and, when a voltage signal is present that is greater than the first threshold voltage, said comparator emits a first switching signal,
- a signal transmitter, especially a microcontroller or microprocessor, that at times emits a control signal,
- a first switch that has a control means, a switch input and a switch output, and that can be regulated or activated through the effect of the control signal on the control means in such a way that it is in the closed state when the signal transmitter emits a control signal, and otherwise it is in the open state, or vice versa, whereby the switch input is connected to the positive or negative first pole of a first direct voltage source and the switch output is connected to the first threshold voltage input, so that the first threshold voltage is equal to the voltage present at the switch output,
- a capacitor via which the switch output is connected to the negative or positive pole of the first direct voltage source, and
- a diode via which the switch output is connected to the first signal input in such a way that the anode or the cathode of the diode is connected to the switch output.

the signal voltage is fed to an adaptive comparator circuit comprising
- a first comparator having a first threshold voltage input to which a first threshold voltage is applied and a first signal input to which a voltage signal is applied and, when a voltage signal is present that is greater than the first threshold voltage, said comparator emits a first switching signal,
- a signal transmitter, especially a microcontroller or microprocessor, that at times emits a control signal,
- a first switch that has a control means, a switch input and a switch output, and that can be regulated or activated through the effect of the control signal on the control means in such a way that it is in the closed state when the signal transmitter emits a control signal, and otherwise it is in the open state, or vice versa, whereby the switch input is connected to the positive or negative first pole of a first direct voltage source and the switch output is connected to the first threshold voltage input, so that the first threshold voltage is equal to the voltage present at the switch output,
- a capacitor via which the switch output is connected to the negative or positive pole of the first direct voltage source, and
- a diode via which the switch output is connected to the first signal input in such a way that the anode or the cathode of the diode is connected to the switch output.

An acoustic distance sensor according to the invention thus comprises the adaptive comparator circuit according to the invention.

Preferably, the control signal emitted by the signal transmitter is an electric control signal and the first switch is an electrically or electronically controlled switch, for example, a transistor, whose base terminal or gate terminal function as a control-current terminal or, for example, a relay. In another embodiment of the invention, the control signal emitted by the signal transmitter is an optical control signal that is emitted, for example, by a light diode, and the diode flow voltage or else to the sum of the voltage signal and the voltage of the second direct voltage source.

The diode flow voltage or the voltage of the second direct voltage source are referred to below as "fundamental voltage distance" dU.

The task of the diode or of the second direct voltage source is to allow the discharging of the capacitor and thus a drop in the threshold voltage for as long as and only until the difference of the threshold voltage minus the voltage signal has dropped to the fundamental voltage distance dU, but to prevent a recharging of the capacitor and thus an increase in the threshold voltage if the voltage signal increases.

Therefore, the time behavior of the threshold voltage proceeds parallel-offset by a fundamental voltage distance dU with respect to that of the voltage signal as long as the voltage signal does not increase. In contrast, if the voltage signal increases, the threshold voltage remains constant. Consequently, a maximum, e.g. a peak, of the voltage signal leads to the triggering of the comparator as soon as the voltage signal exceeds the threshold voltage. If the voltage signal drops again after having increased, then the threshold voltage follows the voltage signal, once again parallel-offset, as soon as the fundamental, voltage distance dU has been reached again.

Hence, according to the invention, the threshold voltage is specified by the magnitude of the voltage signal at every point in time of the receiving phase. If the course over time of the voltage signal is changed, then there is automatically a correspondingly changed course over time of the threshold voltage. Thus, the course over time of the threshold voltage is automatically adapted to that of the voltage signal.

The diode flow voltage is temperature-dependent. It decreases as the temperature rises. Consequently, an acoustic distance sensor according to the invention becomes more sensitive as the temperature rises. On the other hand, the attenuation of ultrasound waves generally increases as the temperature rises. Therefore, the resultant sensitivity loss is advantageously compensated for partially with the use of a diode to create the fundamental voltage distance dU.

As already explained above, according to the invention, instead of the diode, a second direct voltage source can be used whose positive pole is in the place of the anode of the diode and whose negative pole is in the place of the cathode of the diode. In this case, the fundamental voltage distance dU is defined by the voltage supplied by the second direct voltage source.

The basic forms described above of adaptive comparator circuits according to the invention can be advantageously augmented as will be explained below.

In a preferred embodiment of the invention, one of the above-described basic forms has been augmented by a first resistor that is connected between the first pole and the first threshold voltage input, and by a second resistor that is connected between the first threshold voltage input and the second pole, so that the first resistor and the second resistor form a first voltage divider. Therefore, the magnitude of the first threshold voltage $U_{ref1}$ counters the voltage that is supplied by the first voltage divider.

Thus, through the use of the first voltage divider, the voltage distance by which the threshold voltage is parallel-offset with respect to the voltage signal after the voltage signal $U_{signal}$ has died out can advantageously be changed by the fundamental voltage distance dU, to a value $dU_a$. When this embodiment of an adaptive comparator circuit according to the invention is used in an acoustic distance sensor, the sensitivity of the distance sensor that is achieved during the quiescent phase can thus be changed and, in particular increased.

The first voltage divider can be an adjustable potentiometer whose pick-up is connected to the switch output.

Another preferred embodiment of an adaptive comparator circuit according to the invention comprises the following in addition to the basic forms described above:

a second comparator that has a second threshold voltage input and a second signal input, and that emits a second switching signal when a greater voltage is present at the second signal input than at the second threshold voltage input, a third resistor via which the first pole of the first direct voltage source is connected to the second threshold voltage input, a fourth resistor that, on the one hand, is connected to the second threshold voltage input and, on the other hand, to the second pole of the first voltage source, so that the third resistor and the fourth resistor form a second voltage divider, and a second switch that is connected in series to the diode and that can be regulated or activated by the second switching signal in such a way that it is in the closed state when the second comparator emits the second switching signal, and otherwise it is in the open state.

Due to the second voltage divider, a voltage is present at the second threshold voltage input that will be called "second threshold voltage" $U_{ref2}$ below. As long as the second switch is closed, the first threshold voltage follows the dropping voltage signal $U_{signal}$ with the fundamental voltage distance dU, as explained above. According to the invention, however, the second switch opens as soon as the voltage signal $U_{signal}$ exceeds the second threshold voltage $U_{ref2}$. As a result, the discharge of the capacitor and thus the dropping of the first threshold voltage are ended.

Hence, in this embodiment of the invention, the capacitor can only discharge until the first threshold voltage $U_{ref1}$ has dropped to the value of the second threshold voltage $U_{ref2}$.

Thus, through the use of the second voltage divider, the voltage distance by which the first threshold voltage is changed parallel-offset with respect to voltage signal $U_{signal}$ after the decay of the voltage signal $U_{signal}$, advantageously by the fundamental voltage distance dU to a value $dU_b$. When this embodiment of an adaptive comparator circuit according to the invention is used in an acoustic distance sensor according to the invention, the sensitivity of the distance sensor that is achieved during the quiescent phase can thus be reduced.

The second voltage divider can be an adjustable potentiometer whose pick-up is connected to the second threshold voltage input.

In another configuration of this embodiment of the invention, a fifth resistor is connected between the switch output and the second threshold voltage input. Therefore, the magnitude of the first threshold voltage $U_{ref1}$ counters the voltage that is supplied by the second voltage divider. In particular, through the use of the fifth resistor, it can be additionally achieved that the voltage distance by which the threshold voltage is parallel-offset with respect to the voltage signal strives towards a value $dU_b$ that—depending on the voltage supplied by the second voltage divider—can advantageously be not only larger but also smaller than the fundamental voltage distance dU.

When this embodiment of an adaptive comparator circuit according to the invention is used in an acoustic distance sensor, the sensitivity of the distance sensor that is achieved during the quiescent phase can thus be either increased or decreased.

In another advantageous embodiment of the invention, the voltage signal passes through a voltage follower or impedance transformer before reaching the first signal input.

In another embodiment of the invention, a sixth resistor is connected between the control output and the control-current terminal for purposes of limiting the current flow. In another embodiment of the invention, the first switch is a transistor whose base functions as a control-current terminal, whereby a seventh resistor is connected between the base and the first pole of the first direct voltage source.

In another embodiment of the invention, the diode or the second direct voltage source is connected in series with an eighth resistor. This brings about a slowing down of the discharging of the capacitor as well as a smoothing of the threshold voltage, which is advantageous for many applications.

The voltage supplied by the first voltage source is preferably selected such that it is greater in magnitude than the value of the maximum of the voltage signal. In this manner, it is prevented that the first comparator is triggered while the first switch is still closed, that is to say, while the threshold voltage cannot yet adapt to the voltage signal. Moreover, in this manner, it is advantageously achieved that, in any case, the adaptation of the threshold voltage to the voltage signal can begin immediately after the opening of the first switch.

An adaptive comparator circuit according to the invention can be used especially advantageously in an acoustic distance sensor. In this case, the voltage signal is advantageously formed by the envelope curve of the received signal supplied by the sound transducer. This received signal consists of a superimposition of the background signal with the useful echo signal. The formation of the envelope curve, for example, by means of a rectifier circuit, is known from the state of the art and will thus not be elaborated upon in greater depth here.

In the absence of an echo, the envelope curve dies out exponentially during the relaxation phase and, at the beginning of the quiescent phase, turns into a horizontal straight line. Such an envelope curve will be called "background envelope curve" below. The threshold voltage adapts according to the invention to the individual course of the background envelope curve in that it follows said background envelope curve parallel-offset by a voltage distance $dU$ or $dU_a$ or $dU_b$.

An echo causes a peak to be superimposed on the background envelope curve so that the voltage signal increases. According to the invention, the threshold voltage does not follow this increase, so that the comparator is triggered and the echo can thus be detected.

As already mentioned above, the voltage supplied by the first voltage source is preferably selected such that it is greater in magnitude than the value of the maximum of the voltage signal. Since in this case, the threshold voltage already follows the background envelope curve at the voltage distance dU at the beginning of the relaxation phase, the voltage signal in the absence of an echo is not greater than the threshold voltage at any point in time, especially not during the entire relaxation phase. Therefore, throughout the entire receiving phase, the comparator can only be triggered by an echo, but not by the decay behavior of the sound transducer. Thus, an acoustic distance sensor according to the invention is fundamentally able to detect an echo during the quiescent phase as well as especially during the entire relaxation phase. As a result, the undesired short range of the sensor is considerably reduced according to the invention.

BRIEF DESCRIPTION OF THE DRAWING IN WHICH THE FOLLOWING IS SHOWN

Figure 2:
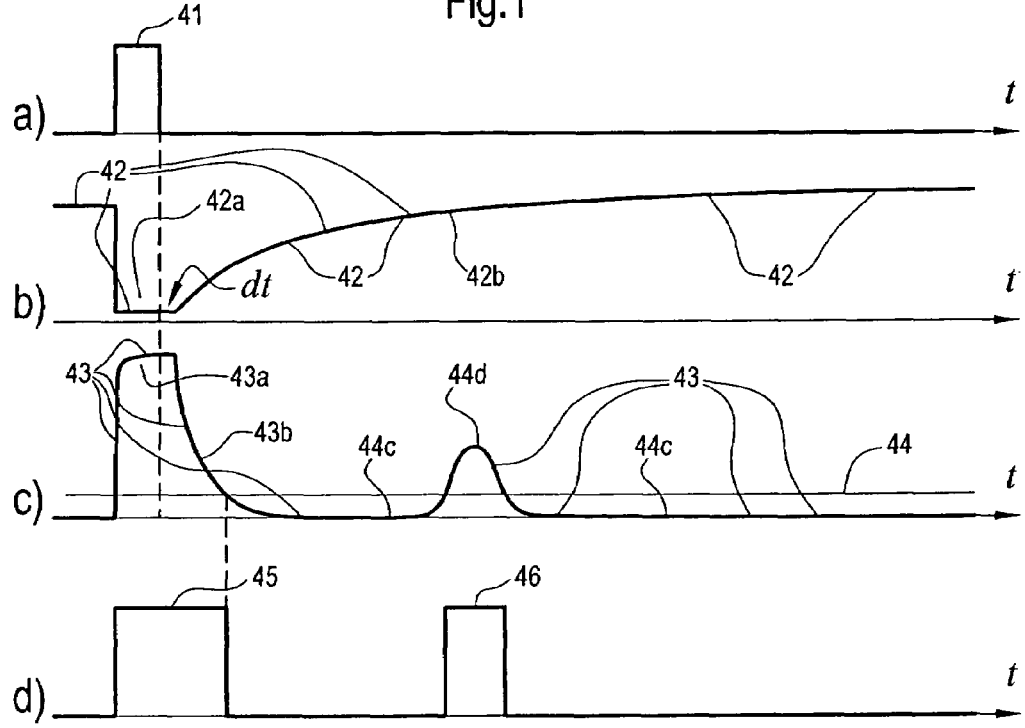
Figure 3:
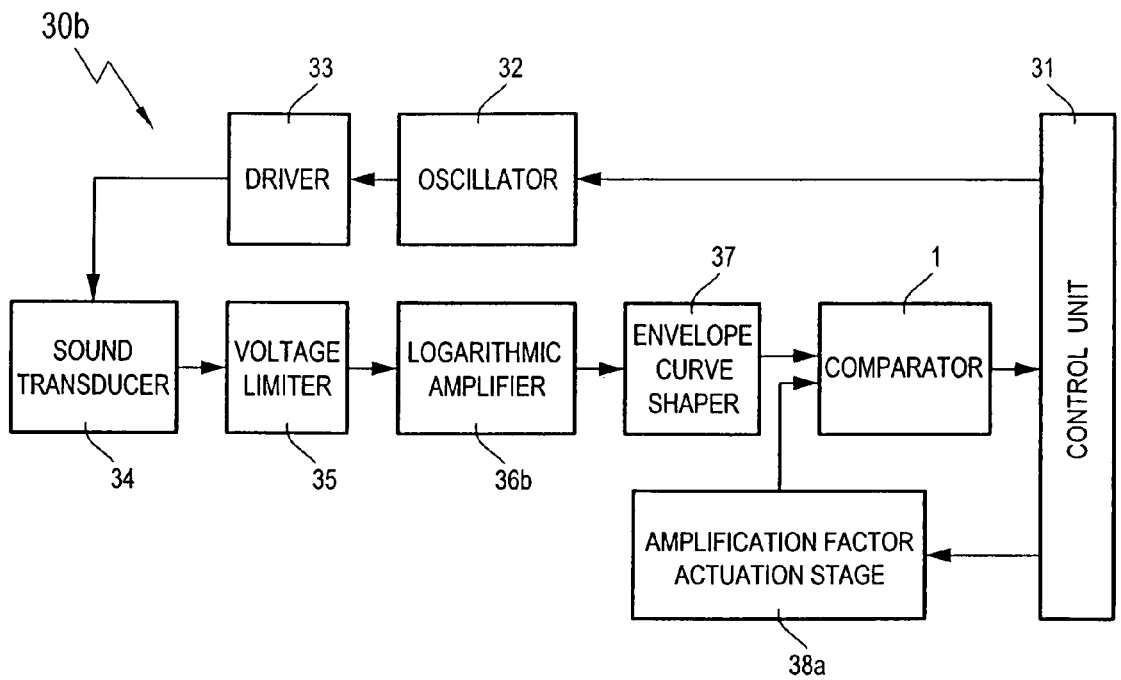
Figure 4:
Figure 4:
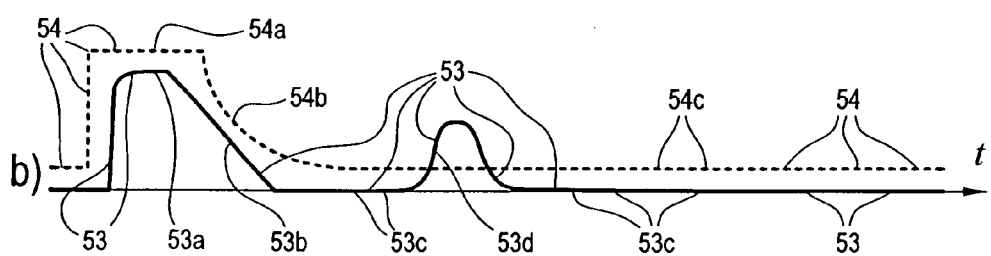
Figure 4:
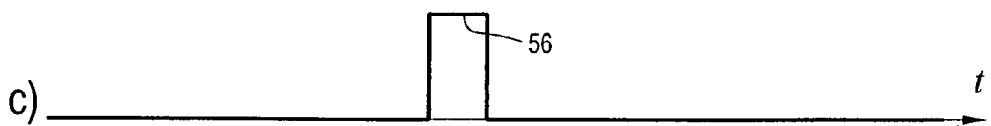
Figure 5:
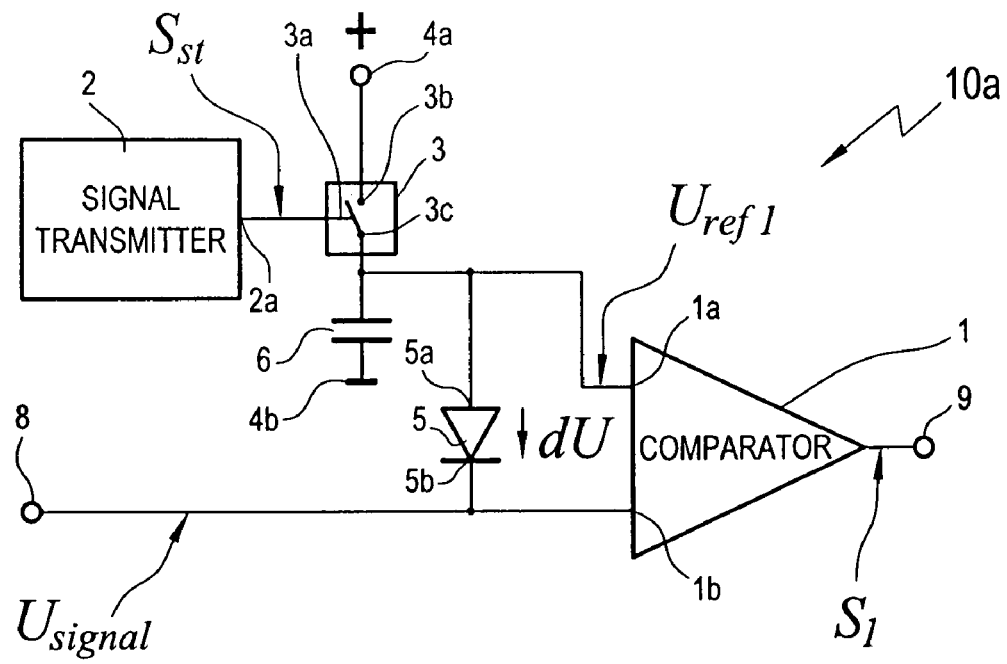
Figure 6:
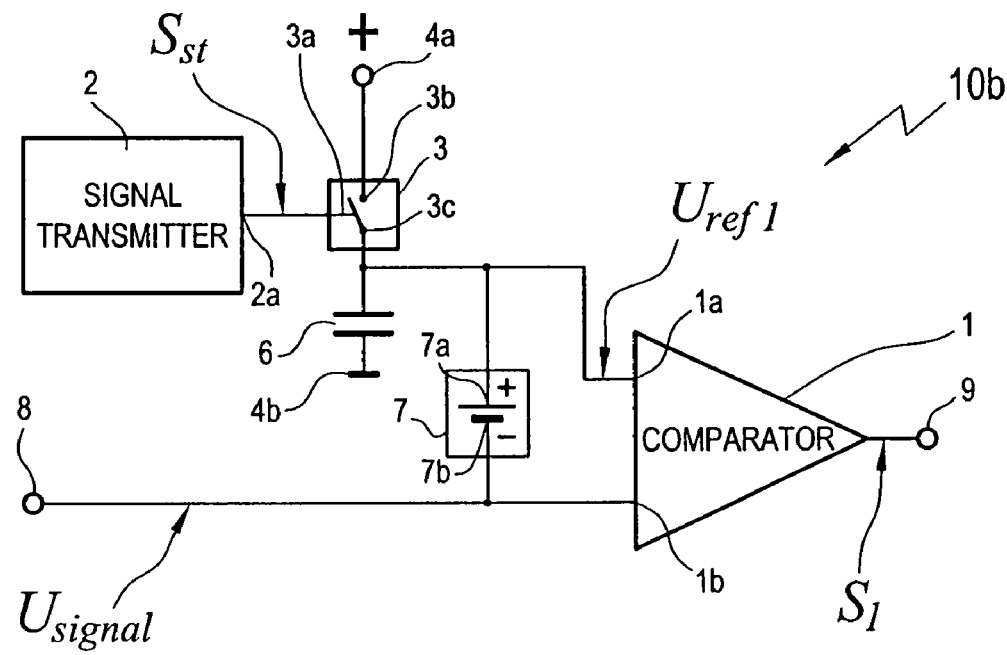
Figure 7:
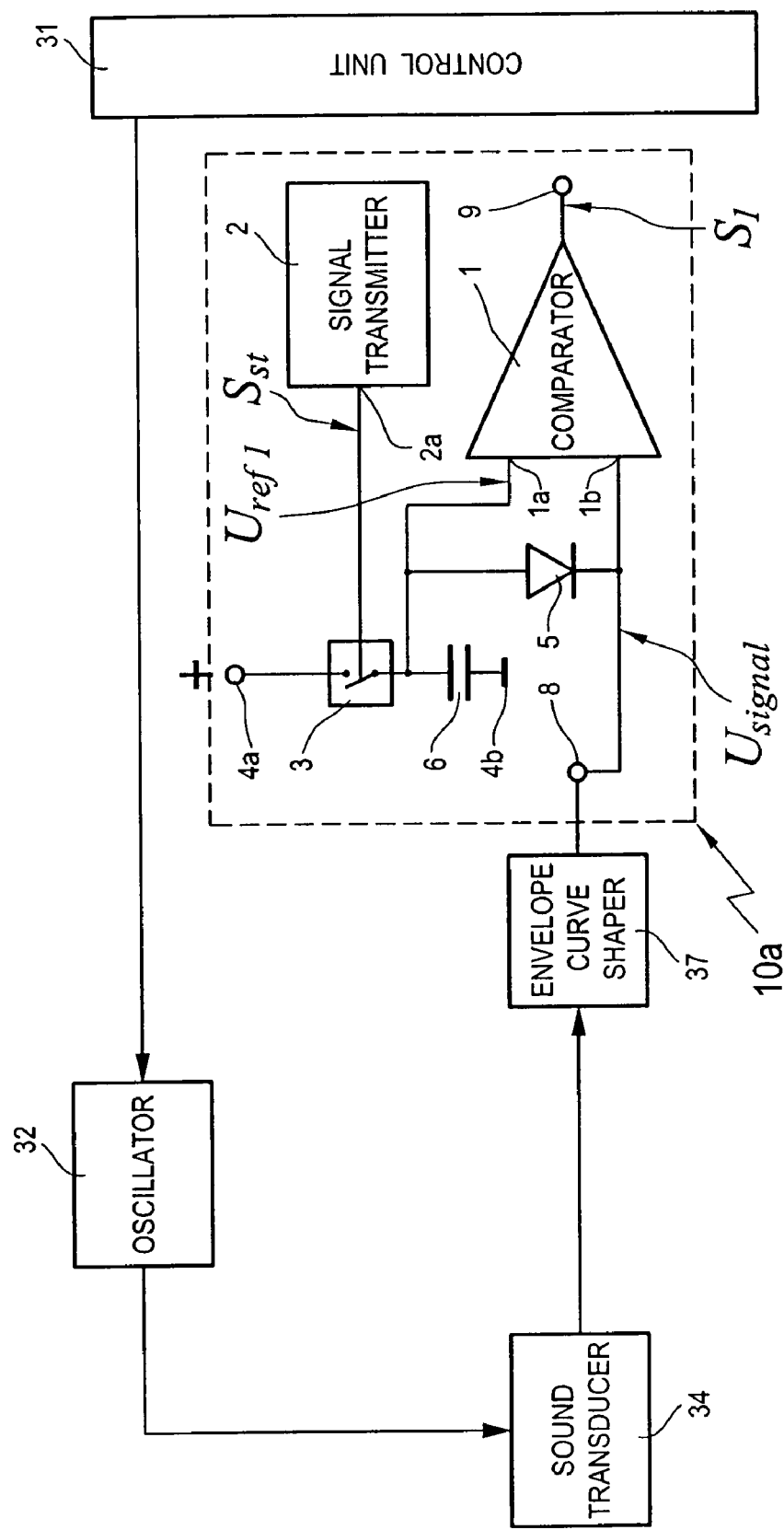
Figure 8:
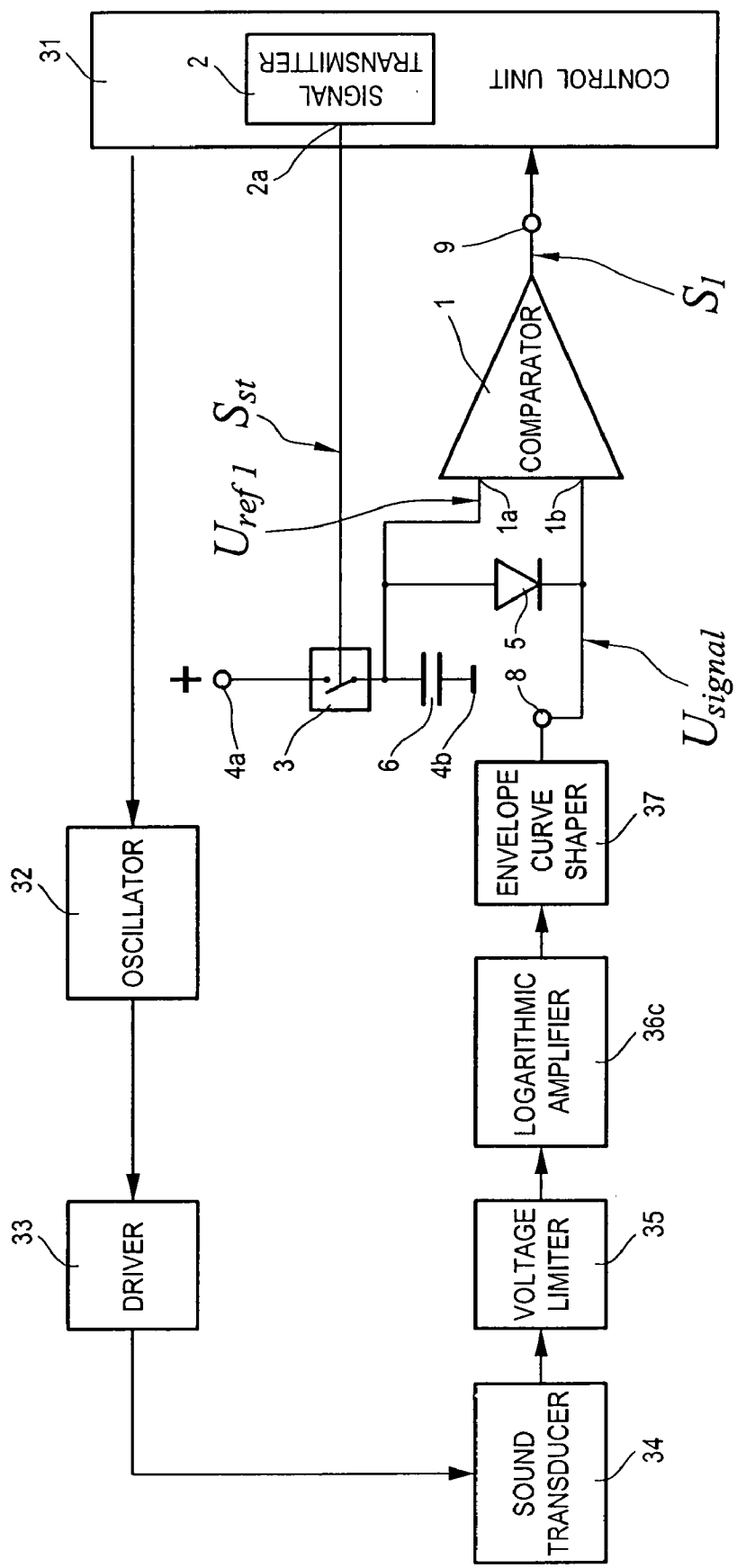
Figure 9:
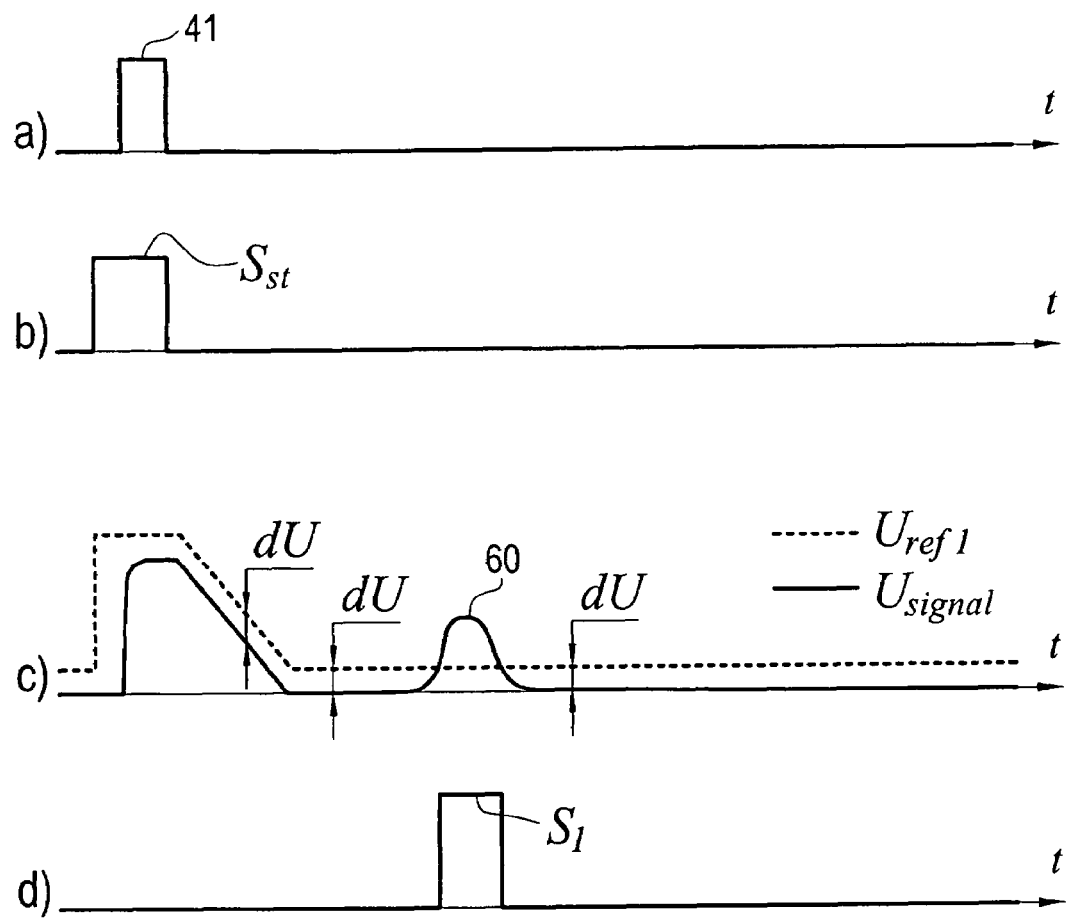
Figure 10:
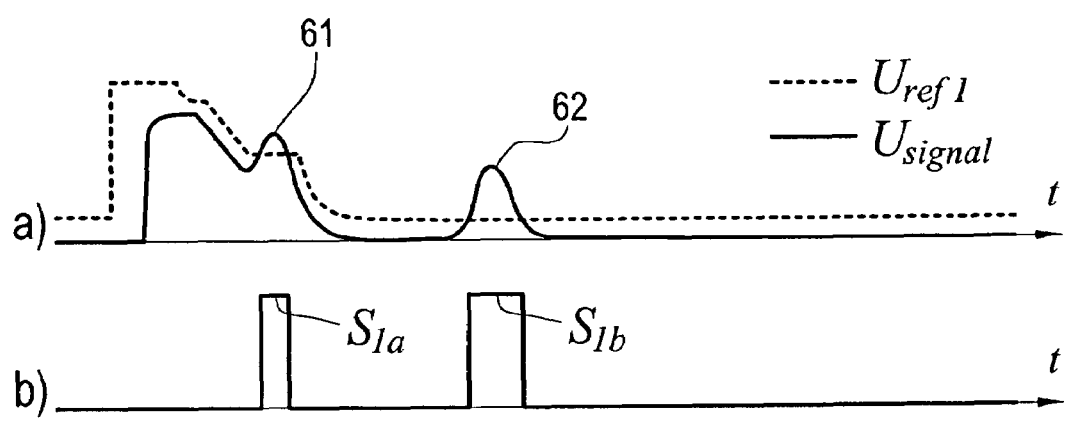
Figure 11:
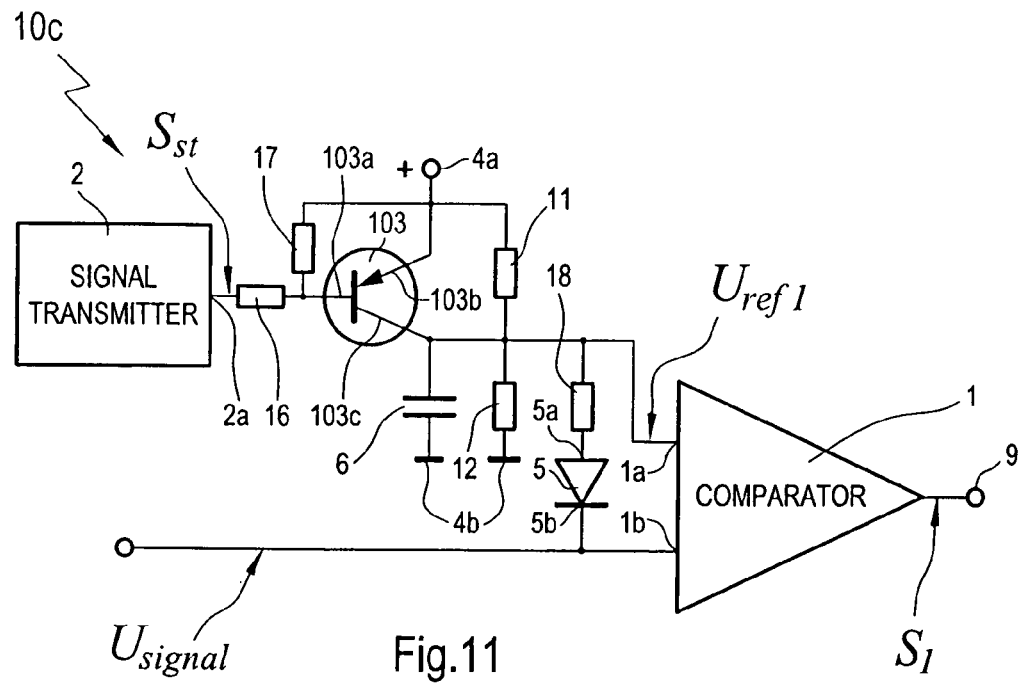
Figure 12:
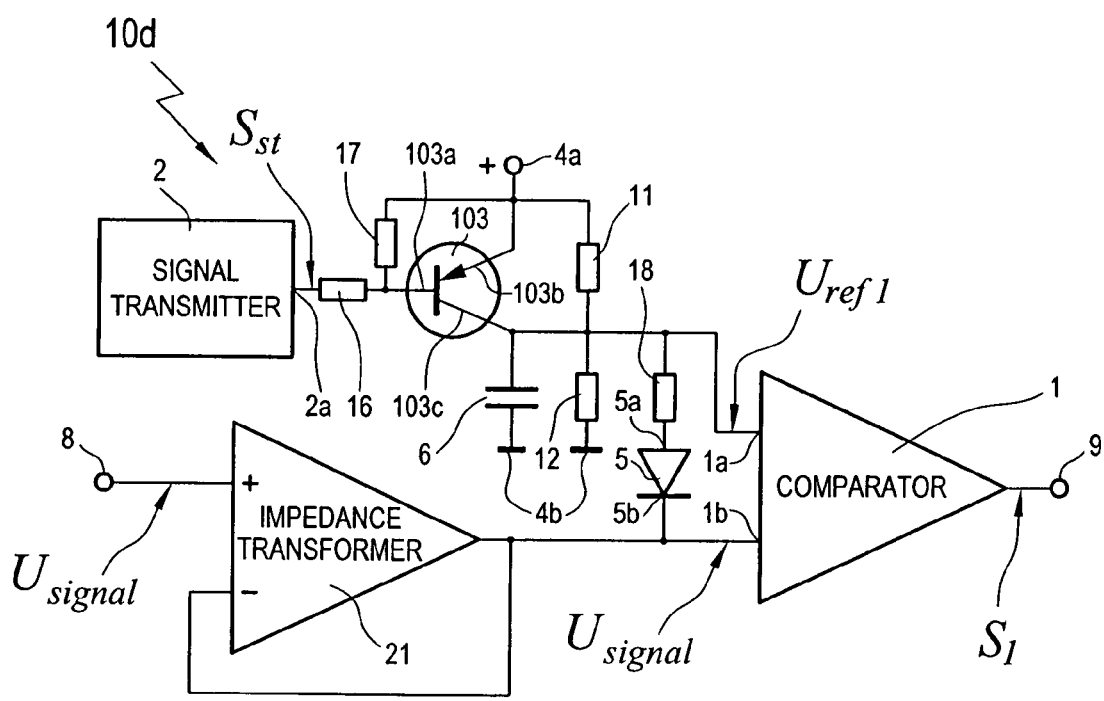
Figure 13:
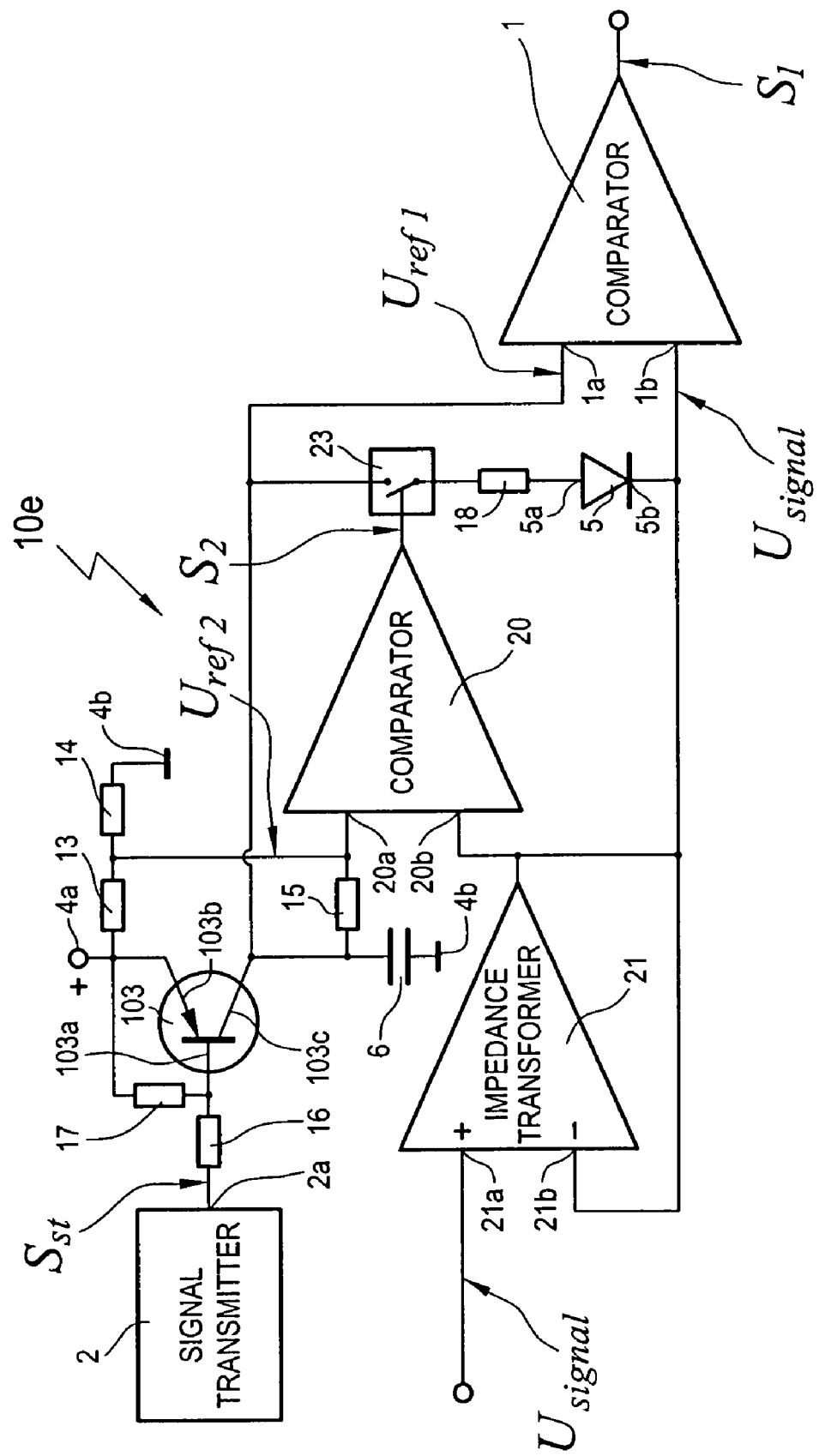

FIG. 1—a schematic block diagram of a variant of an acoustic distance sensor according to the state of the art, FIG. 2—a schematic representation of a typical course over time of a) a signal pulse, b) an amplification factor, c) an envelope curve and d) a comparator output signal, all of which can occur during the operation of the distance sensor shown in FIG. 1, FIG. 3—a schematic block diagram of another variant of an acoustic distance sensor according to the state of the art, FIG. 4—a schematic representation of a typical course over time of a) a timing pulse, b) an envelope curve and c) a comparator output signal, all of which can occur during the operation of the distance sensor shown in FIG. 3, FIG. 5—a circuit diagram of an embodiment of a comparator circuit according to the invention, FIG. 6—a circuit diagram of an alternative embodiment of a comparator circuit according to the invention, FIGS. 7 and 8—a schematic block diagram of embodiments of an acoustic distance sensor according to the invention, FIG. 9—a schematic representation of a typical course over time of a) a signal pulse, b) a control signal, c) an envelope curve and threshold voltage as well as d) a comparator switching signal, all of which can occur during the operation of the distance sensor according to the invention shown in FIG. 8, whereby an echo occurs during the quiescent phase, FIG. 10—a schematic representation of a typical course over time of a) an envelope curve and threshold voltage as well as b) a comparator switching signal, all of which can occur during the operation of the distance sensor according to the invention shown in FIG. 8, whereby an echo additionally occurs during the relaxation phase, and FIGS. 11 to 13—circuit diagrams of further embodiments of comparator circuits according to the invention.

FIGS. 1 to 4 serve to further illustrate the state of the art. FIG. 1 shows a schematic block diagram of a variant of an acoustic distance sensor 30*a* with which a measure according to the state of the art has been taken in order to reduce the short range. The distance sensor 30*a* shown in FIG. 1 comprises a control unit 31, an oscillator 32, a driver 33, a sound transducer 34, a voltage limiter 35, an amplifier 36*a* with regulatable amplification factor, an envelope curve shaper 37, a comparator 1 as well as an amplification factor actuation stage 38*a*.

The control unit 31 transmits short signal pulses 41 to the oscillator 32. The latter oscillates when a signal pulse is applied, thus emitting an alternating voltage of, for example, 400 kHz, which is then amplified by the driver 33 and subsequently used to excite the sound transducer 34 so that the latter is excited so as to oscillate, i.e. to emit sound waves. Corresponding to the short signal pulses, the sound transducer 34 emits short sound wave packets that constitute the transmittal pulse of the distance sensor 30*a*.

an envelope curve shaper 37, a comparator 1 as well as an amplification factor actuation stage 38*a*.

The control unit 31 transmits short signal pulses 41 to the oscillator 32. The latter oscillates when a signal pulse is applied, thus emitting an alternating voltage of, for example, 400 kHz, which is then amplified by the driver 33 and subsequently used to excite the sound transducer 34 so that the latter is excited so as to oscillate, i.e. to emit sound waves. Corresponding to the short signal pulses, the sound transducer 34 emits short sound wave packets that constitute the transmittal pulse of the distance sensor 30*a*.

During the transmitting phase, the sound transducer 34 oscillates at a high oscillation amplitude. This period of time is followed by a relaxation time in which the oscillation amplitude dies out—usually exponentially. In the subsequent quiescent phase, the oscillation amplitude generally remains at a constant mean disturbance level.

The signal emitted by the sound transducer and thus also echoes returning after the distance-proportional propagation time are fed via the voltage limiter 35 to the amplifier 36*a* with a regulatable amplification factor. The voltage limiter keeps the high voltage used for exciting the sound transducer away from the amplifier 36*a*. Using, for example, an internal rectifier circuit, the envelope curve shaper 37 forms the envelope curve of the voltage limiter 35 on the basis of the alternating voltage signal emitted by said voltage limiter 35 and transmits to the comparator 1 an envelope curve voltage signal whose course over time corresponds to that of the envelope curve.

The comparator 1 transmits a switching signal to the control unit 31 for evaluation purposes when the envelope curve voltage signal is greater than a first steadily supplied threshold voltage. In particular, the comparator then emits a switching signal when an echo signal is received whose magnitude exceeds that of the threshold voltage.

In this manner a reduction of the short range can be achieved. The course over time can advantageously be selected in such a way that the distance-dependent attenuation of the echo is countered and the system sensitivity remains constant.

FIG. 2 shows a schematic representation of a course over time of a) a signal pulse, b) an amplification factor of the amplifier 36*a*, c) an envelope curve and threshold voltage as well as d) a comparator output signal, that can typically occur during the operation of the distance sensor shown in FIG. 1. The time axes of the curves a) to d) are selected identically in order to illustrate the courses over time. As was already explained with reference to FIG. 1, during the signal pulse 41, the amplification factor 42 reaches a minimum 42*a* that lasts longer than the signal pulse 41 by a certain lag time dt, and then it grows monotonously over time.

During the signal pulse 41, the envelope curve voltage 43 reaches a maximum (envelope curve segment 43*a*) at which it still remains during the lag time dt after the end of the signal pulse 41. Then the envelope curve voltage 43 drops during the relaxation phase (envelope curve segment 43*b*), whereby the course of the envelope curve 43*b* results from the multiplication of, for example, the exponential decay of the sound transducer amplitude by the growing amplification factor. The temporary lowering of the amplification factor during and after the signal pulse causes the envelope curve voltage 43 to fall below the threshold voltage 44 earlier than would be the case if the amplification factor were not lowered. The advantageous result of this is a reduction of the short range. In the quiescent phase, the envelope curve voltage 43 finally reaches a low constant level (envelope curve segment 43*b*). The threshold voltage 44 is constant over time.

Since the comparator 1 emits a switching signal, as soon as the envelope curve voltage 43 exceeds the threshold voltage 44, in a disadvantageous manner, at the beginning of the signal pulse 41, a dummy switching signal 45 is always triggered that lasts until the envelope curve voltage 43 has dropped below the threshold voltage 44. An echo signal (envelope curve segment 43*d*) causes a useful switching signal 46 so that the control unit has to be capable of distinguishing a useful switching signal 46 from a dummy switching signal 45 which, without the presence of an echo signal, was caused exclusively by the signal pulse 41. The capability to make such a distinction requires complex hardware or software resources and thus entails disadvantages. Further drawbacks associated with a distance sensor of the type illustrated in FIG. 1 were already explained above.

As already explained above, another method of reducing the short range lies in providing a threshold voltage that can be changed over time. For purposes of further illustrating the state of the art, FIG. 3 shows a schematic block diagram of a corresponding variant of an acoustic distance sensor 30*b*. The distance sensor 30*b* shown in FIG. 3 comprises a control unit 31, an oscillator 32, a driver 33, a sound transducer 34, a voltage limiter 35, a preferably logarithmic amplifier 36*b*, an envelope curve shaper 37, a comparator 1 as well as a threshold voltage actuation stage 38*b* which emits a threshold voltage that can be changed over time and transmits it to the comparator 1.

The essential difference from the distance sensor 30*a* illustrated in FIG. 1 lies in the fact that the short range reduction is not achieved by an amplification factor that can be changed over time, but rather by a threshold voltage that can be changed over time.

FIG. 4 shows a schematic representation of a course over time of a) a signal pulse, b) an envelope curve and threshold voltage as well as c) a comparator output signal, that can typically occur during the operation of the distance sensor 30*b* shown in FIG. 3. The time axes of the curves a) to c) are selected identically in order to illustrate the courses over time.

During a signal pulse 41, the envelope curve voltage 53 reaches a maximum (envelope curve segment 53*a*) at which it still remains during the lag time dt after the end of the signal pulse 41. Then the envelope curve voltage 53 drops linearly during the relaxation phase (envelope curve segment 53*b*), since the amplifier 36*b* is a logarithmic amplifier. Finally, in the quiescent phase, the envelope curve voltage 53 reaches a low constant level (envelope curve segment 53*c*).

The threshold voltage 54 is not constant over time but rather is regulated by the threshold voltage actuation stage 38*b* in such a way that it rises before every signal pulse 41, remains at a maximum value for a certain period of time (envelope curve segment 54*a*), then drops (curve segment 54*b*) and finally reaches a constant level (envelope curve segment 54*c*) during the quiescent phase, whereby the threshold voltage 54 remains greater than the envelope curve voltage 53, as long as no echo is received. The threshold voltage actuation stage 38*b* receives the necessary time information for synchronizing the time behavior of the threshold voltage 54 with the rhythm of the signal pulse 41 from the control unit 31.

The advantageous result is a reduction of the short range. Moreover, advantageously, no dummy switching signal is triggered by the signal pulse 41. Rather, a switching signal 56 is triggered only by the rise in the envelope curve 53 (envelope curve segment 53*d*) associated with an echo, so that the switching signal 56 is a useful switching signal 56. Drawbacks associated with a distance sensor of the type illustrated in FIG. 3 were already explained above.

Now reference is made to FIG. 5, which illustrates a schematic circuit diagram of an embodiment 10*a* of an adaptive comparator circuit according to the invention It comprises a signal transmitter 2, a first regulatable switch 3, a capacitor 6, a diode 5 and a first comparator 1, that has a first threshold value input 1a and a first signal input 1b.

At the first threshold voltage input 1a, a threshold voltage $U_{refl}$ is present that is emitted internally in the adaptive comparator circuit according to the invention. At the signal input 1b, a voltage signal $U_{signal}$ is present that can be, for example, an envelope curve of the received signal of a sound transducer and that is fed via a first electric terminal 8 to the adaptive comparator circuit according to the invention.

The first comparator 1 emits a first switching signal $S_1$ when the voltage signal $U_{signal}$ is greater than the first threshold voltage $U_{refl}$. The first switching signal $S_1$ can be tapped, for example; via a second electric terminal 9 and transmitted for evaluation purposes.

Via a control output 2a, the signal transmitter 2 emits an electric control signal $S_{St}$ at times, for example, at regular intervals. In the simplest case, the signal transmitter 2 can be, for instance, a manually operated signaling key. Moreover, the signal transmitter can be, for example, an electronic square-wave timing generator circuit with a suitable duty cycle. Preferably, the signal transmitter 2 is a microcontroller or microprocessor that is programmed in such a way that, at regular intervals, it emits an electric control signal $S_{St}$ having a time duration of typically, for example, 20 microseconds.

The first switch 3 has a control means 3a, a switch input 3b and a switch output 3c. The control means 3a is connected to the control output 2a and can be regulated by the control signal $S_{St}$ in such a way that it is in the closed state when the signal transmitter 2 emits a control signal $S_{St}$, and otherwise it is in the open state. The first switch 3 can be, for example, a transistor.

The switch input 3b is connected to the positive first pole 4a of a first direct voltage source 4a, 4b (not shown here). The switch output 3c is connected to the first threshold value input 1a of the comparator 1, so that the first threshold voltage $U_{refl}$ is equal to the voltage present at the switch output 3c. Thus, when the switch 3 is closed, the potential of the positive first pole 4a is present at the first threshold value input 1a of the comparator 1.

The switch output 3c is also applied via a capacitor 6 to the negative second pole 4b of the first direct voltage source so that the capacitor 6 is charged with the voltage supplied by the first voltage source when the switch 3 is closed.

The switch output 3c is also connected to the anode 5a of a diode 5. The cathode 5b of the diode 5 is connected to the first signal input 1b of the comparator.

As soon as the signal transmitter 2 emits a control signal $S_{St}$, the first switch 3 is in the closed state. Therefore, the capacitor 6 is charged with the voltage supplied by the first voltage source. When the switch 3 is closed, this voltage is also present at the threshold voltage input 1a.

After the end of the control signal $S_{St}$, the switch 3 is in the open state. The capacitor 6 can now discharge according to the invention via the diode 5 to such an extent until the first $U_{refl}$ reaches a value that corresponds to the sum of the voltage signal $U_{signal}$ and the diode flow voltage dU. This means that the voltage that is established at the capacitor 6 depends on the magnitude of the voltage signal $U_{signal}$: the smaller the voltage signal $U_{signal}$, the more the voltage and thus the threshold voltage $U_{refl}$ drop according to the invention at the capacitor.

Hence, a threshold voltage $U_{refl}$ is established that is greater than the voltage signal $U_{signal}$ by the fundamental voltage distance dU.

According to the invention, the task of the diode 5 is to allow the discharging of the capacitor 6 and thus a drop in the threshold voltage $U_{refl}$ for as long as and only until the difference of $U_{refl}-U_{signal}$ has dropped to the fundamental voltage distance dU, but to prevent a recharging of the capacitor and thus an increase in the threshold voltage if the voltage signal $U_{signal}$ increases. If the voltage signal $U_{signal}$ drops, then the threshold voltage $U_{refl}$ follows the voltage signal $U_{signal}$ at the distance dU. In contrast, if the voltage signal $U_{signal}$ increases, then the threshold voltage $U_{refl}$ remains constant because of the blocking effect of the diode 5.

Of course, the polarity of the first direct voltage source can also be the opposite from the one in FIG. 1, so that the first pole 4a is negative and the second pole 4b is positive. In this case, the diode 5 in the circuit shown in FIG. 1 has to be arranged in the reverse direction, so that its cathode is connected to the switch output 3c and its anode to the second pole 4b.

In another embodiment of the invention, the fundamental voltage distance dU is augmented by a codirectional series connection of a plurality of diodes 5 or second direct voltage sources 7.

According to the invention, as an alternative, the function of the diode 5 can be assumed by a second direct voltage source whose positive pole is in the place of the anode 5a of the diode 5 and whose negative pole is in the place of the cathode 5b of the diode 5. FIG. 6 shows an embodiment 10b of an adaptive comparator circuit according to the invention, which can be used as an alternative to that shown in FIG. 1. The diode shown in FIG. 5 has been replaced by a second voltage source 7, whereby its positive pole 7a has been put in the place of the anode 5a and the negative pole 7b has been put in the place of the cathode 5b. The fundamental voltage distance dU shown in FIG. 1 has now been replaced by the voltage of the voltage source 7, that is to say, the fundamental voltage distance dU between $U_{refl}$ and $U_{signal}$ is now defined by the voltage supplied by the second direct voltage source. converting them into an electric received signal, whereby the propagation time of the sound waves is a measure of the distance from the object.

The received signal is fed to an envelope curve shaper 37 which forms the envelope curve of the received signal and transmits it via an electric terminal 8 to the adaptive comparator circuit 10a shown in FIG. 5.

In a preferred embodiment of the invention, the signal pulses 41 that the control unit 31 transmits to the oscillator 32 are synchronized with the control signals $S_{St}$ that the control unit 2 transmits to the switch 3 and this is done in such a way that the control signals $S_{St}$ each begin shortly before the signal pulses 41 as will still be explained below with reference to FIGS. 9a and 9b. In this manner, it is ensured that, already at the beginning of the transmittal phase, the threshold voltage $U_{refl}$ is greater than the voltage signal $U_{signal}$, so that no dummy switching signal is triggered.

In another preferred embodiment of the invention, the signal pulses 41 are advantageously synchronized with the control signals $S_{St}$ in such a way that the control signals $S_{St}$ each begin before or simultaneously with the end of the signal pulses 41. This ensures that, without any time lag, the threshold voltage $U_{refl}$ is supplied to the dropping voltage signal $U_{signal}$ at the fundamental voltage distance dU already at the beginning of the relaxation phase.

The sensitivity of the distance sensor is defined by the fundamental voltage distance dU.

FIG. 8 shows a schematic block diagram of another embodiment of an acoustic distance sensor according to the invention, in which the adaptive comparator circuit 10a shown in FIG. 5 is likewise used. The distance sensor shown in FIG. 8—in comparison to that shown in FIG. 7—additionally has a driver 33 that amplifies the alternating voltage supplied by the oscillator 32 and transmits it to the sound transducer 34. Moreover, before the received signal is fed into the envelope curve shaper 37, it is passed through a voltage limiter 35 and through a logarithmic amplifier 36c.

Among other things, the voltage limiter 35 counters an overmodulation of the amplifier. The amplifier 36c serves to adapt the low input level of just a few microvolts to the higher input level of the subsequent evaluation circuit.

In FIG. 8, in order to facilitate the synchronization, the signal transmitter 2 is accommodated in the control unit 31. For example, the signal transmitter 2 and the control unit 31 can be combined in one single unit, for example, in a microprocessor, that concurrently fulfills the function of the signal transmitter 2 as well as that of the control unit 31.

In FIG. 8, the first switching signal $S_1$ of the control unit 31 is also supplied for evaluation purposes, especially for determining the propagation time and calculating the distance.

FIGS. 9 and 10 serve to further explain the advantageous effects of the invention, whereby the time axes of all of the curves have been selected identically in order to illustrate the course over time.

FIG. 9 shows a schematic representation of a typical course over time of a) a signal pulse, b) a control signal, c) a voltage signal and threshold voltage as well as d) a comparator switching signal, all of which can occur during the operation of the distance sensor according to the invention shown in FIG. 8, whereby an echo occurs during the quiescent phase.

The control unit 31 transmits short signal pulses 41 to the oscillator 32, as a result of which the sound transducer 34 is excited so as to emit a threshold voltage packet (FIG. 9, Curve a). Moreover, the signal transmitter 2 transmits a control signal $S_{St}$ to the switch 3, which is synchronized with the signal pulse 41 in such a way that the control signal $S_{St}$ begins shortly before the signal pulse 41 and ends at the same time as or during the presence of the former (FIG. 9, Curve b).

FIG. 9, Curve c, shows the course of the voltage signal $U_{signal}$ (solid curve) that is identical to the envelope curve, and the course of the threshold voltage $U_{refl}$ (dotted curve). The course of the $U_{signal}$ during the transmittal and relaxation phase and at the beginning of the quiescent phase corresponds essentially to that of the envelope curve 53, which was explained with reference to FIG. 4. While the control signal $S_{St}$ is present at the switch 3, the latter is opened, so that a threshold voltage $U_{refl}$ is established which is identical to the voltage supplied by the first direct voltage source 4a, 4b (FIG. 9, Curve c). Therefore, this has been advantageously selected in such a way that it is greater than the maximum of the voltage signal, so that the adaptation of the threshold voltage to the voltage signal begins immediately after the opening of the switch 3. In the present example, the maximum possible magnitude of the voltage signal is supplied by the voltage limiter 35 or by the overmodulation limit of the amplifier 36c (FIG. 8).

According to the invention, after the end of the control signal $S_{St}$, a threshold voltage $U_{refl}$ is established that is greater than the voltage signal $U_{signal}$ by the voltage distance dU. Therefore, the threshold voltage $U_{refl}$ drops immediately after the end of the control signal by a certain quantity.

From this point in time on, the threshold voltage proceeds parallel-offset by a fundamental voltage distance dU with respect to that of the voltage signal $U_{signal}$ as long as the latter does not increase. A dummy switching signal is not triggered. If, however, the voltage signal $U_{signal}$ increases, the threshold voltage remains constant so that a first echo peak 60 of the voltage signal $U_{signal}$ leads to a triggering of the comparator 1 as soon as the voltage signal $U_{signal}$ exceeds the threshold voltage $U_{refl}$. In this case, the comparator 1 emits a first switching signal $S_1$ (FIG. 9, Curve d).

FIG. 10 shows a schematic representation of a typical course over time of a) a voltage signal and threshold voltage as well as b) a comparator switching signal, all of which can occur during the operation of the distance sensor according to the invention shown in FIG. 8, whereby an echo occurs during the relaxation phase and another echo occurs during the quiescent phase. The courses over time of the signal pulse 41 and of the control signal $S_{St}$ are identical to those shown in FIG. 9.

During the relaxation time, an echo signal occurs, which manifests itself in a second echo peak 61 of the voltage signal $U_{signal}$ (FIG. 10, Curve a). Up until the beginning of the second echo peak 61, the curves correspond to those shown in FIG. 9, Curve c. According to the invention, however, the decrease of the threshold voltage $U_{refl}$ comes to a halt as soon as the voltage signal $U_{signal}$ is no longer dropping, and a first switching signal $S_{1a}$ is triggered by the second echo peak 61. After the second echo peak 61 that occurs during the relaxation time, the fundamental voltage distance dU is once again established between the threshold voltage $U_{refl}$ and the voltage signal $U_{signal}$. During the quiescent phase, another, third echo peak 62 of the voltage signal $U_{signal}$ occurs, as a result of which another switching signal $S_{1b}$ is triggered.

Now reference will be made to FIGS. 11 to 13, which show additional advantageous embodiments of an adaptive comparator circuit according to the invention.

FIG. 11 shows a preferred embodiment 10c of the invention which differs from the adaptive comparator circuit 10a shown in FIG. 6 as follows:

a) The first switch is a transistor 103. The base 103a of the transistor 103 serves as the control-current terminal, the emitter 103b serves as the switch input and the collector 103c as the switch output.

b) A first resistor 11 is connected between the first pole 4a and the first threshold voltage input 1a, and a second resistor 12 is connected between the first threshold voltage input 1a and the second pole 4b, so that the first resistor 11 and the second resistor 12 form a first voltage divider 11, 12. Therefore, the magnitude of the first threshold voltage $U_{refl}$ counters the voltage that is supplied by the first voltage divider. Thus, through the use of the first voltage divider 11, 12, the voltage distance by which the threshold voltage is parallel-offset with respect to the voltage signal after the voltage signal $U_{signal}$ has died out can advantageously be changed by the fundamental voltage distance dU, to a value $dU_a$. When this embodiment 10c of an adaptive comparator circuit according to the invention is used in an acoustic distance sensor, the sensitivity of the distance sensor that is achieved during the quiescent phase can thus be changed and, in particular increased. This is advantageous for many applications such as, for example, for the detection of small objects.

The first voltage divider can be an adjustable potentiometer whose pick-up is connected to the switch output.

c) A sixth resistor 16 is connected between the control output 2a of the signal transmitter 2 and the base 103a, and a seventh resistor 17 is connected between the base 103a and the first pole 4a, which is a plus pole in the example shown. The purpose of these resistors was already explained above.

d) The diode 5 is connected in series to an eighth resistor 18 which serves to slow down the discharging of the capacitor 6 and thus to reduce the speed with which the threshold voltage $U_{ref1}$ is adapted to the voltage signal $U_{signal}$. The eighth resistor also serves to smooth the course of the threshold voltage $U_{ref1}$ with respect to very rapid fluctuations of the voltage signal $U_{signal}$.

FIG. 12 shows another preferred embodiment 10d of the invention, which differs from the adaptive comparator circuit 10c shown in FIG. 11 in that, before the voltage signal $U_{signal}$ reaches the first signal input 1b, it passes through an impedance transformer. This embodiment is especially advantageous when the voltage signal arriving at the electric terminal 8 is high-ohmic, whereby said voltage signal can be the envelope curve voltage generated, for example, by an envelope curve shaper.

FIG. 13 shows another preferred embodiment 10e of the invention which differs from the adaptive comparator circuit 10a shown in FIG. 6 as follows:

a) The first switch is a transistor 103. The base 103a of the transistor 103 serves as the control-current terminal, the emitter 103b serves as the switch input and the collector 103c as the switch output.

b) A second comparator 20 is used that has a second threshold voltage input 20a and a second signal input 20b, and that emits a second switching signal $S_2$ when a greater voltage is present at the second signal input 20b than at the second threshold voltage input 20a.

c) The first pole 4a of the first voltage source 4a, 4b is connected to the second threshold voltage input 20a via a third resistor 13. The second threshold voltage input 20a is connected to the second pole 4b via a fourth resistor 14, so that the third and the fourth resistors 13, 14 form a second voltage divider which can be configured as a potentiometer.

d) The collector 103c that serves as the switch output and the second threshold voltage input 20a are connected via a fifth resistor 15.

e) A second switch 23 is connected in series to the diode 5 and the former can be regulated or activated by the second switching signal $S_2$ in such a way that it is in the closed state when the second comparator 20 emits the second switching signal $S_2$, and otherwise it is in the open state. The second switch 23 can be a transistor.

f) A sixth resistor 16 is connected between the control output 2a of the signal transmitter 2 and the base 103a, and a seventh resistor 17 is connected between the base 103a and the first pole 4a, which is a plus pole in the example shown. The purpose of these resistors was already explained above.

g) The diode 5 is connected in series to an eighth resistor 18. The purpose of this resistor was already explained with reference to FIG. 11.

h) Before reaching the first signal input 1b, the voltage signal passes through an impedance transformer 21 whose purpose was already explained with reference to FIG. 12.

Due to the second voltage divider 13, 14, a voltage $U_{ref2}$ is present at the second threshold voltage input 20a. As long as the second switch 23 is closed, the first threshold voltage $U_{ref1}$ follows the dropping voltage signal $U_{signal}$, parallel-offset by the fundamental voltage distance dU, as explained above. According to the invention, however, the second switch opens as soon as the voltage signal $U_{signal}$ exceeds the second threshold voltage $U_{ref2}$. As a result, the discharge of the capacitor 6 and thus the dropping of the first threshold voltage $U_{ref1}$ are ended.

Hence, in this embodiment of the invention, the capacitor 6 can only discharge until the first threshold voltage $U_{ref1}$ has dropped to the magnitude of the second threshold voltage $U_{ref2}$ supplied by the second potentiometer 13, 14.

Thus, through the use of the second voltage divider 13, 14, the voltage distance by which the first threshold voltage is advantageously changed parallel-offset after the decay of the voltage signal $U_{signal}$ with respect to voltage signal $U_{signal}$, from the fundamental voltage distance dU to a value $dU_b$. The second voltage divider 13, 14 can be an adjustable potentiometer whose pick-up is connected to the second threshold voltage input 20a.

The fifth resistor 15 is connected between the switch output 103c and the second threshold voltage input 20a. Therefore, the magnitude of the first threshold voltage $U_{ref1}$ counters the voltage that is supplied by the second voltage divider 13, 14. In particular, through the use of the fifth resistor 15, it can additionally be achieved that the voltage distance by which the first threshold voltage is parallel-offset with respect to the voltage signal $U_{signal}$ strives towards a value $dU_b$ that—depending on the voltage supplied by the second voltage divider 13, 14—can advantageously be not only larger but also smaller than the fundamental voltage distance dU.

When this embodiment 10e of an adaptive comparator circuit according to the invention is used in an acoustic distance sensor, the sensitivity of the distance sensor that is achieved during the quiescent phase can thus be either increased or decreased by means of the second voltage divider 13, 14.

All of the embodiments of an adaptive comparator circuit according to the invention and thus also the embodiments 10b, 10c, 10d and 10e illustrated in FIG. 6 and FIGS. 11 to 13 can be used according to the invention in the acoustic distance sensor shown in FIG. 8 instead of the adaptive comparator circuit 10a shown there by way of an example.

COMMERCIAL UTILIZATION

The invention can be utilized commercially, for example, in distance measuring technology, in filling level measuring technology and in automation technology.

The main figure is FIG. 5.

LIST OF REFERENCE NUMERALS AND LETTERS

1 first comparator
1a first threshold voltage input
1b first signal input
2 signal transmitter
2a control output of 2
2b input of 2
3 first switch
3a control-current terminal of 3
3b switch input of 3
3c switch output of 3
4a, 4b first, second pole of the first direct voltage source
5 diode
5a, 5b anode, cathode of 5
6 capacitor
7a, 7b positive, negative pole of 7
7 second direct voltage source
8, 9 first, second electric terminal
10a,b,c,d,e adaptive comparator circuits
11-18 first to eighth resistor
20 second comparator 20a second threshold voltage input
20b second signal input
21 voltage follower
23 second switch
30a distance sensor with constant threshold voltage
30b distance sensor with variable threshold voltage
31 control unit
32 oscillator
33 driver
34 sound transducer
35 voltage limiter
36a amplifier with regulatable amplification factor
36b, c logarithmic amplifier
37 envelope curve shaper
38a amplification factor actuation stage
38b threshold voltage actuation stage
41 signal pulses
42 course over time of the amplification factor of 36a
42a minimum of 42
43, 53 courses over time of the envelope curve voltage
43a, 53a segments of 43, 53 during the signal pulses 41, 51
43b, 53b segments of 43, 53 during the relaxation time of 34
43c, 53c segments of 43, 53 during the quiescent phase
43d, 53d segments of 43, 53 during an echo
44, 54 threshold voltage of 30a, 30b
45 dummy switching signal
46, 56 useful switching signals
60 first echo peak
61 second echo peak
62 third echo peak
103 transistor
103a base of 103
103b emitter of 103
103c collector of 103
$S_1$, $S_{1a}$, $S_{1b}$ switching signals of 1
$S_2$ switching signal of 20
dU fundamental voltage distance
$U_{ref1}$ first threshold voltage
$U_{signal}$ voltage signal

The invention claimed is:

1. An adaptive comparator circuit, particularly for an acoustic distance sensor, comprising a first comparator (1),
    having a first threshold voltage input (1a) to which a first threshold voltage ($U_{ref1}$) is applied and
    a first signal input (1b) to which a voltage signal ($U_{signal}$) is applied and, when a voltage signal ($U_{signal}$) is present that is greater than the first threshold voltage ($U_{ref1}$), said comparator emits a first switching signal ($S_1$), characterized by
        a signal transmitter (2), especially a microcontroller or microprocessor, that at times emits a control signal ($S_{St}$),
        a first switch (3, 103) that has a control means (3a, 103a), a switch input (3b, 103b) and a switch output (3c, 103c), and that can be regulated or activated through the effect of the control signal ($S_{St}$) on the control means (3a, 103a) in such a way that it is in the closed state when the signal transmitter (2) emits a control signal ($S_{St}$), and otherwise it is in the open state, or vice versa, whereby the switch input (3b, 103b) is connected to the positive or negative first pole (4a) of a first direct voltage source and the switch output (3c, 103c) is connected to the first threshold voltage input (1a), so that the first threshold voltage ($U_{ref1}$) is equal to the voltage present at the switch output (3c, 103c),
        a capacitor (6) via which the switch output is connected to the negative or positive pole (4b) of the first direct voltage source, and
        a diode (5) via which the switch output (3c, 103c) is connected to the first signal input (1b) in such a way that the anode (5a) or the cathode (5b) of the diode (5) is connected to the switch output (3c, 103c).

2. The adaptive comparator according to claim 1, characterized in that, a second direct voltage source (7) is used whose positive pole (7a) is in the place of the anode (5a) of the diode (5) and whose negative pole (7b) is in the place of the cathode (5b) of the diode (5).

3. The adaptive comparator according to claim 2, characterized in that the voltage supplied by the second voltage source (7) can be regulated or adjusted.

4. The adaptive comparator according to claim 1, characterized in that the signal transmitter (2) emits an electric control signal ($S_{St}$) at regular intervals.

5. The adaptive comparator according to claim 1, characterized in that the first switch (3, 103) is a switch that can be electrically or electronically controlled by the control means (3a, 103a) and the control signal ($S_{St}$) is an electric signal that is transmitted by the signal transmitter (2) via a control output (2a) and fed to the control input (3a, 103a).

6. The adaptive comparator according to claim 5, characterized in that the first switch (3, 103) is a transistor (103) and the control-current terminal (3a, 103a) is the base (103) or the gate terminal of the transistor (103).

7. The adaptive comparator according to claim 1, characterized in that a first resistor (11) is connected between the first pole (4a) and the first threshold voltage input (1a), and a second resistor (12) is connected between the first threshold voltage input (1a) and the second pole (4b), so that the first resistor (11) and the second resistor (12) form a first voltage divider (11, 12).

8. The adaptive comparator according to claim 7, characterized in that first voltage divider (11, 12) is an adjustable potentiometer whose pick-up is connected to the switch output (3c, 103c).

9. The adaptive comparator according to claim 1, characterized by
    a second comparator (20) that has a second threshold voltage input (20a) and a second signal input (20b), and that emits a second switching signal $S_2$ when a greater voltage is present at the second signal input (20b) than at the second threshold voltage input (20a),
    a third resistor (13) via which the first pole (4a) is connected to the second threshold voltage input (20a),
    a fourth resistor (14) that is connected to the second threshold voltage input (20a) and to the second pole (4b) of the first voltage source, so that the third resistor (13) and the fourth resistor (14) form a second voltage divider (13, 14),
    a second switch (23) that is connected in series to the diode (5) and that can be regulated or activated by the second switching signal $S_2$ in such a way that it is in the closed state when the second comparator (20) emits the second switching signal $S_2$, and otherwise it is in the open state.

10. The adaptive comparator according to claim 9, characterized in that a fifth resistor (15) is connected between the switch output (3c, 103c) and the second threshold voltage input (20a).

11. The adaptive comparator according to claim 9, characterized in that the second voltage divider (13, 14) is a potentiometer.

12. The adaptive comparator according to claim 1, characterized in that a sixth resistor (16) is connected between the control output (2a) and the control-current terminal (3a, 103a).

13. The adaptive comparator according to claim 6, characterized in that a seventh resistor (17) is connected between the control-current terminal (3a, 103a) and the first pole (4a).

14. The adaptive comparator according to claim 1, characterized in that the diode (5) or a second voltage source (7) is connected in series to an eighth resistor (18).

15. The adaptive comparator according to claim 1, characterized in that, before reaching the first signal input (1b), the voltage signal $U_{signal}$ passes through a voltage follower or impedance transformer (21).

16. The adaptive comparator according to claim 1, characterized in that the voltage supplied by the first voltage source (4a, 4b) is greater in magnitude than the voltage of the maximum of the voltage signal $U_{signal}$.

17. The adaptive comparator according to claim 1, characterized in that the diode (5) is connected to at least another diode codirectionally in series.

18. An acoustic distance sensor, comprising a control unit (31) that at times transmits signal pulses (41) to an oscillator (32) which, during the presence of a signal pulse (41), transmits an alternating voltage to a sound transducer (34) that is excited by the alternating voltage to emit sound waves and that is capable of receiving sound waves coming back to the sound transducer (34) as an echo as a result of reflection, and of converting them into an electric received signal, and also comprising an envelope curve shaper (37) to which the received signal is fed and which forms the envelope curve of the received signal and emits it as a voltage signal $U_{signal}$, characterized in that the voltage signal is fed to an adaptive comparator circuit comprising a first comparator (1) having a first threshold voltage input (1a) to which a first threshold voltage ($U_{refl}$) is applied and a first signal input (1b) to which a voltage signal ($U_{signal}$) is applied and, when a voltage signal ($U_{signal}$) is present that is greater than the first threshold voltage $U_{refl}$, said comparator (1) emits a first switching signal ($S_1$), a signal transmitter (2), especially a microcontroller or microprocessor, that at times emits a control signal ($S_{St}$), a first switch (3, 103) that has a control means (3a, 103a), a switch input (3b, 103b) and a switch output (3c, 103c), and that can be regulated or activated through the effect of the control signal ($S_{St}$) on the control means (3a, 103a) in such a way that it is in the closed state when the signal transmitter (2) emits a control signal ($S_{St}$), and otherwise it is in the open state, or vice versa, whereby the switch input (3b, 103b) is connected to the positive or negative first pole (4a) of a first direct voltage source and the switch output (3c, 103c) is connected to the first threshold voltage input (1a), so that the first threshold voltage ($U_{refl}$) is equal to the voltage present at the switch output (3c, 103c), a capacitor (6) via which the switch output (3c, 103c) is connected to the negative or positive pole (4b) of the first direct voltage source, and a diode (5) via which the switch output (3c, 103c) is connected to the first signal input (1b) in such a way that the anode (5a) or the cathode (5b) of the diode (5) is connected to the switch output (3c, 103c).

19. The acoustic distance sensor according to claim 18, characterized in that a second direct voltage source (7) is used whose positive pole (7a) is in the place of the anode (5a) of the diode (5) and whose negative pole (7b) is in the place of the cathode (5b) of the diode (5).

20. The acoustic distance sensor according to claim 18 characterized in that the alternating voltage emitted by the oscillator (32) reaches the sound transducer (34) after passing through a driver stage (33).

21. The acoustic distance sensor according to claim 18, characterized in that, before entering the envelope curve shaper (37), the received signal passes through an amplifier (36c).

22. The acoustic distance sensor according to claim 21, characterized in that the amplifier (36c) is a logarithmic amplifier.

23. The acoustic distance sensor according to claim 18, characterized in that, before entering the envelope curve shaper (37), the received signal passes through a voltage limiter (35) that limits the amplitude of the received signal to a maximum value.

24. The acoustic distance sensor according to claim 18, characterized in that the signal transmitter (2) is integrated into the control unit (31) or is a component of the control unit (31).

25. The acoustic distance sensor according to claim 18, characterized in that the first switching signal ($S_1$) is transmitted to the control unit (31) for evaluation purposes.

26. The acoustic distance sensor according to claim 18, characterized in that the signal pulses (41) are synchronized with the control signals ($S_{St}$) in such a way that the control signals ($S_{St}$) each begin before the signal pulses (41).

27. The acoustic distance sensor according to claim 18, characterized in that the signal pulses 41 are synchronized with the control signals $S_{St}$ in such a way that the control signals $S_{St}$ each begin before or simultaneously with the end of the signal pulses (41).

28. An adaptive comparator circuit for an acoustic distance sensor, comprising a first comparator (1) having a first signal input and a first threshold voltage input; a first direct voltage source (4) for delivering a threshold voltage to the first threshold voltage input, wherein the first direct voltage source comprises a first and a second pole; a first switch (3), wherein the first switch is connected to the first direct voltage source and to the first threshold voltage input;

a signal transmitter (2), wherein the signal transmitter controls the first switch through an input of the switch;

a capacitor (6), wherein a first plate of the capacitor is connected to the a first threshold voltage input and wherein a second plate of the capacitor is connected to second pole the first direct voltage source;

a diode (5) connected the first signal input and to the first threshold voltage input of the first comparator.

29. The adaptive comparator circuit according to claim 28, wherein the diode is connected in series to a first resistor.

30. The adaptive comparator circuit according to claim 1, wherein the signal transmitter emits an electric control signal at regular intervals.

31. The adaptive comparator circuit according to claim 28 further comprising a second resistor (11) connected between the first pole of the first direct voltage source and the first threshold voltage input, and a third resistor (12) connected between the first threshold voltage input and the second pole of the first direct voltage source, so that the second resistor (11) and the third resistor (12) form a first voltage divider (11, 12).

32. The adaptive comparator circuit according to claim 31, wherein the first voltage divider (11, 12) is an adjustable potentiometer whose pick-up is connected to the first threshold voltage input.

33. The adaptive comparator circuit according to claim 28 further comprising
- a fourth resistor (17) connected between the first pole of the first direct voltage source and the input of the first switch;
- a fifth resistor (16) connected between the input of the first switch and the output of the signal transmitter (2).

34. The adaptive comparator circuit according to claim 28, wherein a voltage signal, before reaching the first signal input, passes through a voltage follower or an impedance transformer (21).

35. The adaptive comparator circuit according to claim 28 further comprising
- a second comparator (20), wherein a signal input of the second comparator is connected to the signal input the of the first comparator and to an output of an impedance transformer (21); and wherein a threshold voltage input of the second comparator is connected to a sixth resistor.

36. The adaptive comparator circuit according to claim 31 wherein the first voltage divider (11, 12) is connected to the first threshold voltage input of the first comparator through a sixth resistor.

* * * * *